ELECTRICAL PULSE GENERATOR

Filed July 15, 1947 2 SHEETS—SHEET 1

INVENTORS:
Gaston Potier, and
Pierre Cornet
by Ben. J. Chromy, atty

Dec. 18, 1951 G. POTIER ET AL 2,578,982

ELECTRICAL PULSE GENERATOR

Filed July 15, 1947 2 SHEETS—SHEET 2

INVENTORS:
Gaston Potier, and
Pierre Cornet
by Ben. J. Chromy, atty

Patented Dec. 18, 1951 2,578,982

UNITED STATES PATENT OFFICE 2,578,982

ELECTRICAL PULSE GENERATOR

Gaston Potier, Versailles, and Pierre Cornet, Paris, France, assignors to Societe française Sadir-Carpentier, Paris, France, a corporation of France Application July 15, 1947, Serial No. 760,980
In France April 2, 1946

Section 1, Public Law 690, August 8, 1946
Patent expires April 2, 1966

3 Claims. (Cl. 250—36)

The present invention relates to improvements in electrical pulse generators and more particularly to saw tooth pulse generators, and will be described with reference to the accompanying drawings in which.

Figure 1:
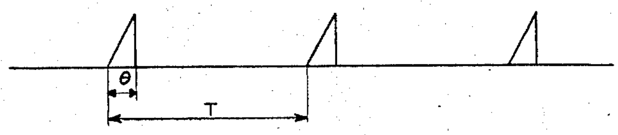
Figs. 1 and 3 show diagrams used in the explanation.

In the art of television as well as in other applications such as radiolocating, sawtoothed pulses are used, such as shown in Fig. 1 in which voltage is plotted against time. First the voltage linearly increases during a time $\theta$ then suddenly falls to zero, such pulses periodically recurring in time at intervals T which are large compared to the time $\theta$. It is often necessary that $\theta$ is very small with respect to T, for example of the order of 2 to 3 microseconds, T being of the order of a millisecond. In this condition, difficulties may be experienced in obtaining pulses having a rear face of sufficient steepness, with circuits commonly used for that purpose i. e. with circuits comprising a condenser which is charged under constant current for obtaining the rising portion of the saw tooth and which is suddenly discharged, for example through a valve, for obtaining the steep decreasing portion of the curve. In such circuits, the internal resistance of the discharge element, which cannot be decreased under a determined value, constitutes with the condenser to be discharged, a circuit the time constant of which cannot substantially be brought to a lesser value than a tenth of a microsecond; which results in the rear face of the pulse lasting about a quarter of microsecond, if the discharge is supposed to be ended when the voltage has dropped to one tenth of its maximum value. There is, however, a great need for obtaining a discharge period of much shorter duration.

The present invention provides means for arriving at such pulses of great steepness of rear or for front, based upon the quick change of voltage which occurs in response of an intensity change, preferably accompanied by a reversal of sense or direction, of the current at the terminals of a resistor. Such an operation may be obtained by taking or picking the pulse voltage from the terminals of a capacitance resistance network. A constant current charging of the capacitance element of such a network ensures the linear increase of voltage of the saw-tooth, and a quick change of circuit values for instance by means of an electronic device introducing an auxiliary resistance across said network thereby producing a reversal of sense of the current flowing through the resistor associated with the condenser also producing an increase of the absolute value of said current. This results in a sudden change of voltage and which provides the desired steep rear face of the pulse. As the factor which controls the rapidity of said current reversal is the self-inductance of the above combination and since it is well known how to manufacture resistors with very small self-inductance coefficients, it may be seen that the present invention leads to the production of pulses with very steep faces. This has been proved by the practical results obtained with the circuit described herein, said circuit producing pulses with rear faces lasting less than a tenth of a microsecond.

Figure 2:
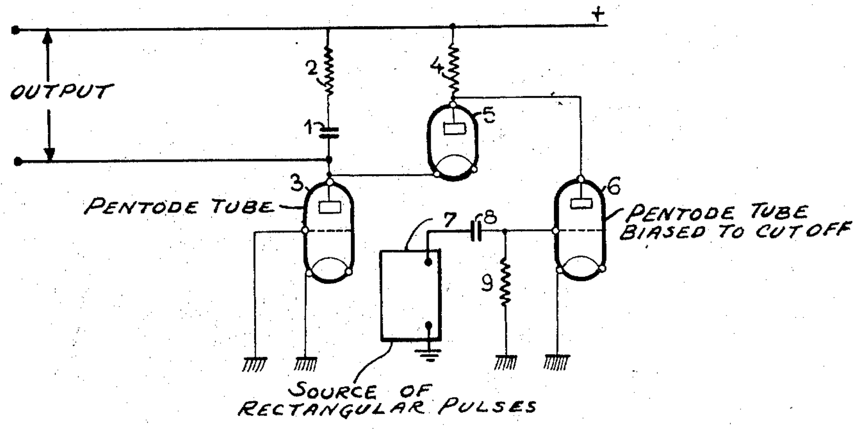
Fig. 2 illustrates a circuit embodying some features of the invention.

An illustrative embodiment is schematically shown in Fig. 2. The pulse voltage is picked off of the terminals of a network comprising a condenser 1 and a resistor 2, in series, charged under constant current by means of a pentode tube 3, as well known in the art.

Across the terminals of said network 1—2, a resistor 4 and a diode tube 5 are connected, also in series. The cathode of the diode 5 is connected to the plate of tube 3. Resistor 4 is inserted into the plate circuit of a tube 6, preferably of the pentode type, the control grid of which is supplied with rectangular positive pulses from the lead 7, through a coupling condenser 8. The control grid of the tube 6 is grounded through a leak resistance 9.

This circuit operates as follows: Positive steep front pulses, preferably of square wave form, periodically recurring at intervals T of suitable amplitude, are applied through lead 7 upon the grid of tube 6. This grid is negatively biased to cut off during the intervals between said pulses, hence tube 6 is blocked. The plate current of tube 3 flows through resistor 4 and diode tube 5 (the internal resistance of which is very low), hence a voltage drop U (indicated as $u_1$ in Fig. 3) is produced across resistor 4. Condenser 1 is charged by current flowing through the tube 3 and the resistor 2 to a voltage $w_1+a$ which is equal to the voltage drop across the diode 5 and the resistor 4 while the tube 6 is blocked. When a pulse is applied through lead 7, upon the control grid of tube 6, said tube is unblocked. The plate current flowing through the tube 6 is of substantially greater value than the plate current of tube 3. As a result an increased voltage drop V is obtained across resistor 4, hence the current flowing through diode 5 is interrupted. The plate current of the pentode 3 then flows through resistor 2, and charges condenser 1, to produce the linear oblique portion $u_2$ of the saw-tooth voltage wave. The various elements are so dimensioned that, at the end of the pulse applied upon tube 6, the voltage generated across the network 1—2 is of a lesser value than the increased voltage drop V. The final voltage across the terminals of the capacitor 1 and resistor 2 is the sum of a voltage $a$ across resistance 2, plus the initial voltage $u_1$ across condenser 1 plus the additional voltage $u_2$, resulting from the increase of charge of the condenser 1. The value of voltage $a$ is $r_1i_1$, $r_1$ being the value of resistance 2 and $i_1$ the intensity of the charge current. As soon as the pulse fed by conductor 7 ends, tube 6 is blocked, which cuts off the voltage V. Condenser 1 then discharges through the resistors 2 and 4 and diode 5, and the charge current of pentode 3 begins again to pass through the resistor 4 and the diode 5. The current flowing through resistance 2 changes of sense and takes the value:

$$i_2=\frac{u_1+u_2-r_1i_1}{r_1+r_2}$$

$r_2$ being the value of resistance 4 and the term $r_2i_1$ resulting from the charge current of the pentode 3 through resistance 4.

The result is that the voltage across the capacitor 1 and resistor 2 changes suddenly from the value:

$$u_1+u_2+r_1i_1$$

to the value $$u_1+u_2-r_1i_2$$

hence a sudden change of value:

$$u_3=r_1(i+i_2)=r_1\left(i_1+\frac{u_1+u_2+r_2i_1}{r_1+r_2}\right)=\frac{r_1}{r_1+r_2}(r_1i_1+u_1+u_2)$$

Figure 3:
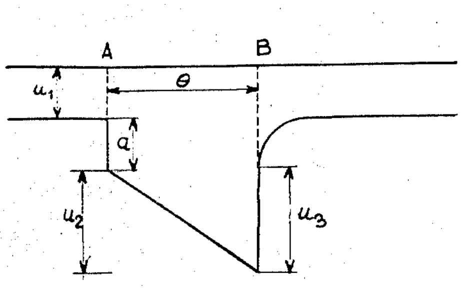

This change constitutes the rear face of the pulse shown in Figure 3, and does not depend upon the condenser discharge as it happens before the beginning of said discharge. After this, the condenser discharges to the voltage value $u_1$. According to the invention, a suitable bias voltage source is connected into the load circuit, in order to use only the portion of the saw-tooth of an amplitude equal to $u_2$, on one hand, and to limit the rear face of the pulse to the sudden amplitude change $u_3$ on the other hand.

Fig. 3 shows the curve of the voltage across the capacitor 1 and resistor 2 plotted against time. The pulse of duration $\theta$ begins at A and ends at B. The positive value of the high voltage source is taken as the zero point, the curve being thus plotted on the negative side of the voltage axis. At point A, there is a steep voltage change of value $a=r_1i_1$ due to the charging current $i_1$. Between points A and B there occurs a linear voltage variation of amplitude $u_2$. At point B there takes place a sudden change of amplitude $u_3$ caused by the stopping of the anode current of tube 6, and thereafter the curve corresponds to the discharge of condenser 1.

It will be noted that the above described circuit is not self-oscillating, being positively controlled by pulses applied to the lead 7. Tube 6 is only active during said pulses, and thus may develop a current of great magnitude, which gives a great value for the voltage V, and to the amplitude of the saw-tooth. The duration of the saw-tooth pulse may be made by using circuit components of certain values, practically equal to $\theta$ ($u_3$ being higher than $u_2$), i. e. equal to the duration of the control pulse. Further it may be noted that the steepness of the rear face of the control pulse reacts on the steepness of the rear face of the generated pulse, but means are well known for generating rectangular pulses with substantially vertical faces.

Numerous changes may be made in the circuit of Fig. 2, such as, bias voltage sources may be connected to the grids, automatic biasing means may be provided between cathodes and grounds etc. The control pulses fed by lead 7 may be applied on the control grid of the pentode tube 3, or this grid may receive positive pulses from another origin; and in the alternative, the charge of the condenser 1 may be made to start only when tubes 3 and 6 are simultaneously unblocked. Furthermore the diode 5 may be replaced by a dry rectifier, etc.

Figure 4:
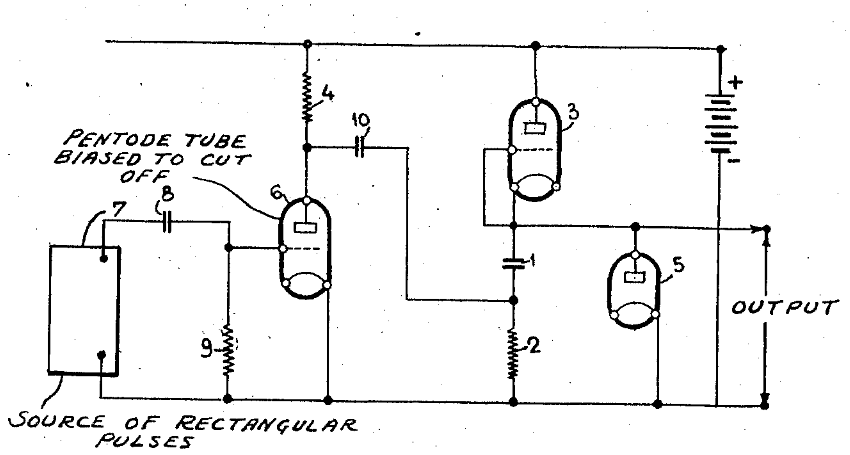
Figs. 4 and 5 show alternatives of the circuit of Fig. 2.

An alternative such as shown in Figure 4 of the circuit of Fig. 2 is also contemplated. This alternative circuit provides a voltage change across resistance 2 by applying onto it a pulse of a shape substantially identical to that of the control pulse fed by lead 7. Such an alternative is of special interest and advantage when the voltage generated across the resistor 2 is of such a polarity that it ensures the blocking of the diode 5. Under these conditions the resistance 4 in the discharge circuit may be omitted thus decreasing the delay time necessary for the discharge of condenser 1. Furthermore, under these conditions in order that condenser 1 be discharged through diode 5 at the moment the pulse applied across the resistor 2 ends, it is necessary that the voltage developed across condenser 1 be of an opposite polarity to that of the voltage established across resistance 2. This may be done with the circuit shown in Fig. 4 in which the network condenser 1 resistance 2 is inserted in the cathode circuit of tube 3, the resistance 4 being only active as a load resistance for tube 6. A coupling condenser 10 connects the plate circuit of tube 6 to the connection point between resistance 2 and condenser 1.

Positive rectangular control pulses are applied through lead 7 on the grid of tube 6, in which they may be amplitude limited if required, according to a well known mechanism. Tube 6 is blocked between said pulses and, when excited, generates in its plate circuit, negative pulses which are applied through condenser 10 to the connection point between the capacitor 1 and the resistor 2; in this way the polarities of the voltages developed across the capacitor 1 and the resistor 2 are of opposite sense as desired.

Tube 3 operates as a constant current generator when no control pulses are present, the generated current flowing through diode 5. As soon as a pulse arrives at the said connection point between the capacitor 1 and the resistor 2, this point becomes negative. A constant voltage is developed across resistance 2 and diode 5 is blocked hence a sudden voltage change is provided ensuring a very steep face for the generated saw tooth.

Condenser 1 is then charged in linear relation with time until the voltage of the aforesaid connection point becomes again equal to that of the ground. Diode 5 is then rendered conductive, thus stopping the charge of condenser 1 until the end of the pulse. At this moment the diode discharges the condenser but said discharge is of very brief duration because of the low value of the interval resistance of the diode.

The duration of that saw tooth pulse is at most equal to that of the control pulse, but it may be lessened either by decreasing the amplitude of the pulses developed across resistance 2; or by increasing the value of the charge current of condenser 1. In the first case, the duration of the saw tooth is proportional to the amplitude of the pulse transmitted by condenser 10 and is of the same amplitude. In the second case, the saw tooth retains the same amplitude and linearity whatever may be the duration of the control pulse. This constitutes a marked advantage when said saw tooth is used for oscillographic scanning purpose.

With a constant current generator, such as tube 3, the charge of the condenser is linear with time. This generator may however, be replaced by a variable resistance, in which case the charge will be of exponential shape but only the substantially linear portion of which is utilised.

Figure 5:
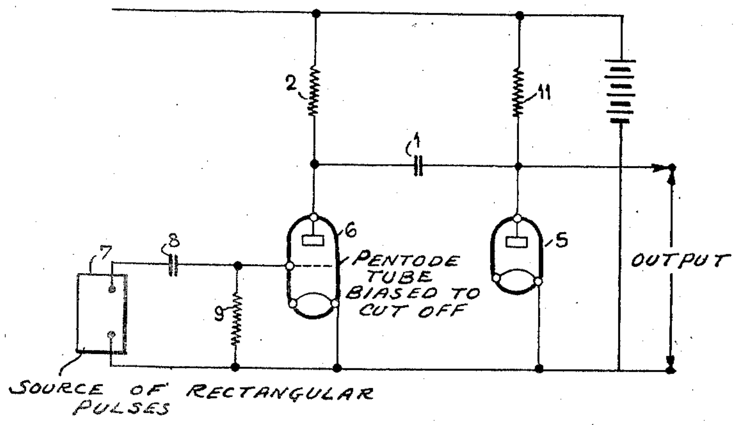

A circuit alternative of Fig. 4 is shown in Fig. 5 in which the condenser 10 is omitted. Tube 3 is replaced by an adjustable resistance 11 and resistance 2 is connected in the plate circuit of tube 6, the grid of which receives the positive control pulses.

When no pulse is applied, through lead 7, on the control grid of tube 6, the resistance of diode 5 is low and condenser 1 is charged up to the voltage across resistance 11, the adjustment of which defines said voltage.

When a control pulse arrives on the central grid of the tube 6, a voltage change appears across the resistance 2, which is led by condenser 1 to the plate of the diode, thus providing a negative bias which increases the internal resistance of this diode up to a high value. The voltage developed across the condenser 1 is then higher than that developed across resistances 2 and 11. Condenser 1 discharges through resistances 2 and 11 until the voltage across the diode is on the verge of becoming positive, thus interrupting the discharge of the condenser. When the control pulse ends, the circuit condition is as follows: The output voltage of tube 6 is zero, the voltage across condenser 1 is in opposition with respect to the high D. C. voltage, and the values of resistance 2 and the internal resistance of diode 5, are the only limitations to the charge current of condenser 1 which quickly regains its normal potential before the occurrence of the following pulse.

Having now described our invention, we declare that what we claim is:

1. A circuit for generating saw tooth pulses comprising in combination a tube having a cathode, a control grid and a plate, means for biasing said tube to normally substantially block current passage therethrough, a source of rectangular control pulses of such amplitude as to unblock said tube connected to the control grid thereof, a resistor connected to the plate of said tube, a constant amplitude voltage source connected across said tube and said resistor, a second resistor and a variable resistance device connected in series across said voltage source, a capacitor having one side connected to the plate of said tube and the other side connected to the common connection between said second resistor and said variable resistance device and connections to the terminals of said variable resistance device for taking off the saw tooth impulses.

2. A circuit for generating saw tooth pulses comprising in combination a tube having a cathode, a control grid and a plate, means for biasing said tube to normally substantially block current passage therethrough, a source of rectangular control pulses of such amplitude as to unblock said tube connected to the control grid thereof, a resistor connected to the plate of said tube, a constant amplitude voltage source connected across said tube and said resistor, a capacitor and a second resistor connected in series across said first mentioned resistor and a variable resistance device having one terminal connected to a point between said capacitor and said second resistor and having the other terminal connected to the negative pole of said source, and connections to said terminals for the taking off of the saw tooth impulses.

3. A circuit for generating saw tooth pulses having steep rear or front faces comprising in combination a tube having an input circuit and a plate circuit, means for biasing said tube for normally substantially blocking passage of current therethrough, a source of rectangular control pulses of such amplitude as to unblock said tube connected to the input circuit thereof, a capacitor connected to the plate circuit of said tube, a source of constant potential, connections including a resistance for connecting the positive pole of said source to the plate of said tube, a diode, a resistor connected between the positive pole of said source and the plate of said diode, connections for connecting said capacitor between plate of said first mentioned tube and the plate of said diode and connections to the terminals of said diode for taking off the saw tooth impulses.

GASTON POTIER.
PIERRE CORNET.

REFERENCES CITED

The following references are of record in the file of this patent:

UNITED STATES PATENTS

| Number | Name | Date |
|---|---|---|
| 2,241,256 | Gould | May 6, 1941 |
| 2,258,752 | Fewings et al. | Oct. 14, 1941 |
| 2,350,069 | Schrader et al. | May 30, 1944 |
| 2,419,606 | Stodola | Apr. 29, 1947 |